United States Patent [19]
Gilbert

[11] Patent Number: 5,463,409
[45] Date of Patent: Oct. 31, 1995

[54] TRACKER BALLS

[75] Inventor: David P. Gilbert, Lincoln, United Kingdom

[73] Assignee: Plessey Semiconductors Limited, United Kingdom

[21] Appl. No.: 236,965

[22] Filed: May 2, 1994

[30] Foreign Application Priority Data

Jun. 21, 1993 [GB] United Kingdom ............... 9312738

[51] Int. Cl.⁶ ..................................................... G09G 3/02
[52] U.S. Cl. ........................................... 345/167; 345/157
[58] Field of Search ..................................... 345/157, 156, 345/167, 161, 163, 164; 74/471 XY

[56] References Cited

U.S. PATENT DOCUMENTS 4,806,917  2/1989  Hosogoe ........................... 74/47 XY
5,271,290  12/1993  Fischer ............................. 74/471 XY

FOREIGN PATENT DOCUMENTS 2221016  8/1992  United Kingdom.

Primary Examiner—Curtis Kuntz
Assistant Examiner—Vivian Chang
Attorney, Agent, or Firm—Kirschstein et al.

[57] ABSTRACT

A trackerball arrangement includes a ball rotatably mounted with respect to a housing; a plurality of supports arranged to locate the ball in a predetermined operable position relative to the housing, at least one of the supports being mounted for movement away from the other supports; and being urged towards said other supports against a stop by the action of a resilient member acting upon it; whereby pressure which is applied via the ball to the supports causes movement of the supports when the applied pressure exceeds a threshold value which overcomes the force exerted by the resilient member. The movement allows lateral movement of the ball away from the other supports. The support is mounted on a spring loaded pivotable arm with an engagement part biased into contact with the surface of the ball and part of the pivotable arm is arranged to actuate an electrical switch mechanism.

4 Claims, 1 Drawing Sheet

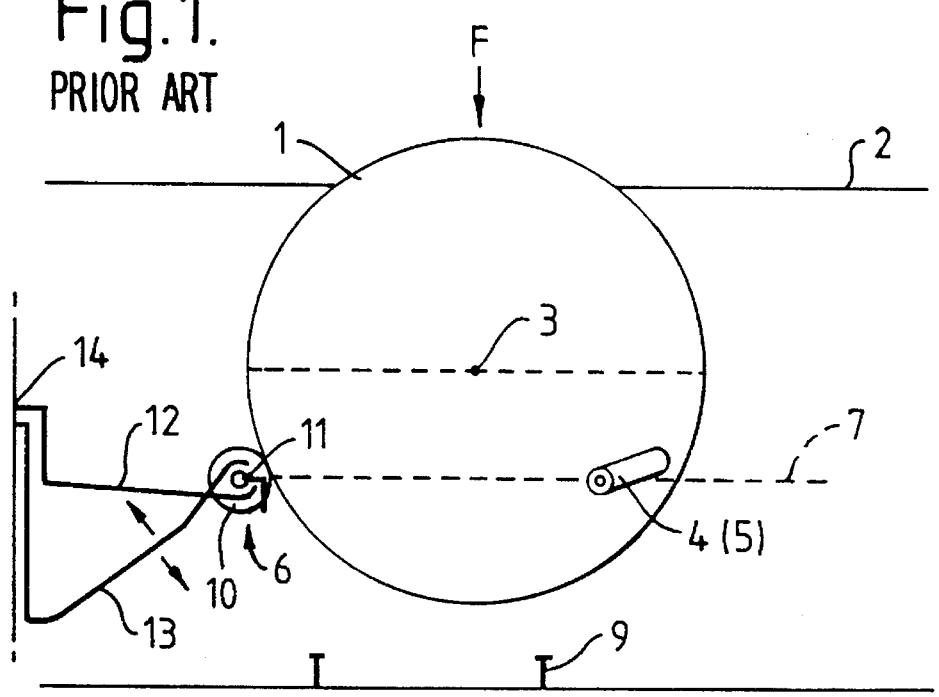
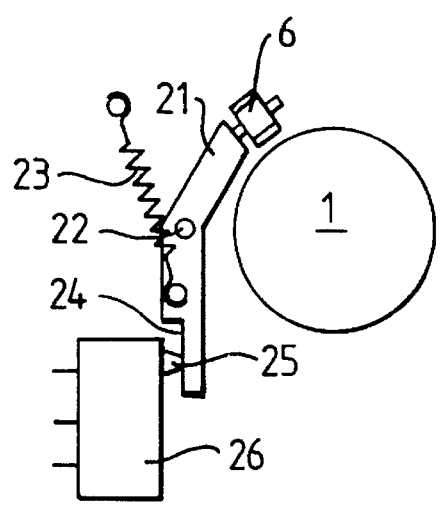

TRACKER BALLS

BACKGROUND OF THE INVENTION

This invention relates to a trackerball arrangement in which rotation of a ball by hand movement causes the generation of corresponding electrical signals. Such arrangements are commonly used in conjunction with display screens for the purpose of moving a cursor or the like around the screen. The electrical signals may be indicative of the extent of rotation of the ball or merely of its sense. It is customary for separate electrical signals to be generated which are respectively indicative of rotation about orthogonal x and y axes, and these signals may be derived from the rotational motion of the rollers which bear against the surface of the ball. As the ball has a smooth surface, the frictional grip between the ball and a roller is very low, and any resistance by a roller to rotation will result in the roller slipping against the surface of the ball so that the resulting electrical signals do not faithfully represent the movement of the ball.

Any imperfection in the operation of the bearings, by which a roller is supported, degrades the operation of the trackerball arrangement. It has been found that the bearings and rollers are susceptible to shocks delivered via the ball.

A trackerball arrangement which reduces the effects of shock is described and claimed in British Patent Specification No. 2221016B in which a ball is rotatably mounted with respect to a housing; and a plurality of supports are arranged to locate the ball in a predetermined operable position, at least one of the supports being mounted for movement away from the other supports; and said one of the supports being urged towards said other supports against a stop by the action of resilient means acting upon it; whereby pressure which is applied via the ball to the supports causes movements of said one of the supports when the applied pressure exceeds a threshold value which overcomes the force exerted by said resilient means, said movement allowing lateral movement of the ball away from the other supports. In this way excessive shocks applied to the top of the ball do not cause damage to the ball supports at the point of contact between them.

The lateral movement of the ball away from the other supports is arranged preferably to allow the ball to drop, such that shock impacts on the ball are largely absorbed by the downwards movement of the ball and the resilience of a support.

SUMMARY OF THE INVENTION

It is an object of the present invention to provide an improved form of support for a trackerball arrangement and which permits a switching action to be effected readily and simply.

According to the present invention there is provided an improved trackerball arrangement of the kind including a ball rotatably mounted with respect to a housing; a plurality of supports arranged to locate the ball in a predetermined operable position relative to the housing, at least one of the supports being mounted for movement away from the other supports; and said one of the supports being urged towards said other supports against a stop by the action of resilient means acting upon it; whereby pressure which is applied via the ball to the supports causes movement of said one of the supports when the applied pressure exceeds a threshold value which overcomes the force exerted by said resilient means, said movement allowing lateral movement of the ball away from the other supports, and in which the said one of the supports is mounted on a spring loaded pivotable arm with an engagement part being arranged to be biased into contact with the surface of the ball.

The pivoted arm may be a bell crank lever. Part of the pivoted arm may be arranged to actuate an electrical switch mechanism. If the arm is a bell crank lever this part is the end not carrying the engagement part and would engage a dolly on the switch mechanism.

BRIEF DESCRIPTION OF THE DRAWINGS

The invention is further described by way of example with reference to the accompanying drawing in which:

FIG. 1 is a view of a known trackerball arrangement, and

FIG. 2 is a view of the trackerball arrangement of the invention.

DETAILED DESCRIPTION OF THE PREFERRED EMBODIMENT

Referring to the drawings, a trackerball arrangement includes a solid ball 1 mounted in a housing 14 so that a small portion of the ball 1 protrudes through an aperture in a top plate 2 of the housing.

The ball 1 is free to rotate in all directions about its centre point 3 and may be rotated by using the fingertips or the palm of the hand. The ball 1 is supported, below its centre point 3 by two orthogonal rollers 4 and 5 (of which only 4 is visible in the drawing) and a third support 6 positioned in a common horizontal plane 7. The rollers 4 and 5 are supported by bearings (not shown) which are attached to means for supporting them in a fixed position relative to the housing.

As the rollers 4 and 5 are in contact with the ball 1 the rotational movement of the ball 1 generates electrical signals representative of the rotation of the two rollers 4 and 5 via optical angle encoders (not shown) attached to the rollers in conventional manner.

In use, shock forces can be inadvertently applied to the support 6. A vertically applied force F results in a force of $$\frac{F}{SinX}$$

on the supports where X is the angle between a horizontal plane through the centre point 3 and the position of the support.

The ball 1 rests on a number of supports of which one support 6 is resiliently mounted. The resiliently mounted support 6 consists of a rotatable wheel 10 having a pin 11 passing through its axis of rotation. The ends of the pin 11 which protrude past either side of the wheel 10 are supported by a pair of guiding rafts 12 which are attached to the housing 14.

The outer ends of the guides 12 are shaped so as to provide a stop position for the pin 11. The pin 11 is urged against the end stop by a pair of leaf springs 13, the outer ends of which bear against the pin 11 and the inner ends are attached to the housing 14.

The springs 13 hold the pin 11 against the end stop provided no force greater than the threshold value F is applied to the top of the ball 1. The ball 1 is located in a predetermined position from which it is displaced when a force greater than F is applied. In order to prevent damage to the supports the resilience of the leaf springs 13 permits the wheel 10 to move so that the pin 11 travels along the guides 12 towards the housing 14. As the wheel 10 moves away so the ball 1 that was supported partly on the wheel is now free to move laterally away from the rollers 4 and 5 and then to fall against a circular rim 9, the position of which is offset from the position of the aperture of the top plate 2 such that the rim holds the ball out of contact with the rollers 4 and 5.

When the force F is removed the resilience of the support 6 causes the ball 1 to be restored to its original position.

When the ball is subject to an abrupt shock resulting in a downwardly applied force which is in excess of a threshold value, it is largely dissipated in the resilience of support 6 and the downward movement of the ball, thereby minimizing the risk of damage to the rollers 4 and 5.

The arrangement described so far is that disclosed in British Patent Specification No. 2221016 and if reference is now made to FIG. 2 of the accompanying drawings, it can be appreciated how the support 6 can be modified to give an improved support in accordance with the invention. Here the support role of 6 is mounted for free rotation on one end of a bell crank arm lever 21 which pivots about a point 22 and is biased towards the ball 1 by a tensioned spring 23. The end of the lever 21 not carrying support 6 is recessed to accommodate at 24 the dolly 25 of an electrical switch 26.

In operation as the ball is rotated the support roller 6 and the X and Y rollers 4, 5 are also rotated to give the usual X and Y co-ordinate signals. When it is desired to mark the positions of a cursor on the screen which operates in response to the X and Y signals, the ball 1 is depressed causing support 6 to move the end of the lever arm 21 round pivot point 22 and to operate at 24 the dolly 25 of switch 26 to cause the switch to actuate. When pressure is released the spring 23 causes the lever arm 21 to return to its original position as shown deflecting the dolly 25 to alter the condition of the switch 26.

It will be appreciated that depression of the ball 1 causes the rollers 4 and 5 to rotate slightly which can cause a mispositioning of the cursor. Any problems arising from this can be compensated for electronically by adjustments in the software of the cursor being controlled.

The use of spring 23 replaces the spring 13 of FIG. 1 and also minimizes the risk of damage to rollers 4 and 5.

I claim:

1. A trackerball arrangement, comprising: a housing; a ball rotatably mounted with respect to the housing; a plurality of supports arranged to locate the ball in a predetermined operable position relative to the housing, at least one of the supports being mounted on a pivotable arm for movement towards and away from the other supports; spring means arranged to act upon said pivotable arm for urging said one of the supports with a force towards the other supports; and stop means for limiting the movement of said one of the supports towards the other supports; said force exerted by said spring means being overcome in response to pressure which exceeds a threshold value and which is applied to the supports by way of the ball, thereby causing movement of said one of the supports away from the other supports and allowing lateral movement of the ball.

2. The trackerball arrangement in accordance with claim 1, wherein the pivotable arm is a bell crank lever.

3. The trackerball arrangement in accordance with claim 1, including an actuatable electrical switch mechanism, and wherein the pivotable arm has a part arranged to actuate the electrical switch mechanism.

4. The trackerball arrangement in accordance with claim 3, wherein the pivotable arm is a bell crank lever, one part of which is arranged to carry said one of the supports, and another part of which is arranged to engage with an actuating member on the switch mechanism, and wherein the actuating member constitutes said stop means.

* * * * *